United States Patent
Dhoolia et al.

(10) Patent No.: US 10,395,641 B2
(45) Date of Patent: Aug. 27, 2019

(54) MODIFYING A LANGUAGE CONVERSATION MODEL

(71) Applicant: International Business Machines Coporation, Armonk, NY (US)

(72) Inventors: Pankaj Dhoolia, Uttar Pradesh (IN); Sachindra Joshi, Gurgaon (IN); David Nahamoo, Great Neck, NY (US); Dinesh Raghu, New Delhi (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/427,585

(22) Filed: Feb. 8, 2017

(65) Prior Publication Data

US 2018/0226067 A1 Aug. 9, 2018

(51) Int. Cl.
*G10L 15/18* (2013.01)
*G10L 15/01* (2013.01)
*G10L 15/22* (2006.01)

(52) U.S. Cl.
CPC .............. *G10L 15/01* (2013.01); *G10L 15/18* (2013.01); *G10L 15/22* (2013.01)

(58) Field of Classification Search
CPC ....... G10L 15/063; G10L 15/18; G10L 15/22; G10L 15/01; G10L 2015/221; G10L 2015/0635

USPC ........................................................ 704/235
See application file for complete search history.

(56) References Cited

U.S. PATENT DOCUMENTS

| | | | | |
|---|---|---|---|---|
| 2003/0105634 A1* | 6/2003 | Abella | ..................... | G10L 15/22 704/257 |
| 2014/0365226 A1* | 12/2014 | Sinha | ...................... | G10L 25/00 704/275 |
| 2018/0137855 A1* | 5/2018 | Lee | ...................... | G10L 15/1815 |

* cited by examiner

*Primary Examiner* — Bharatkumar S Shah
(74) *Attorney, Agent, or Firm* — Cantor Colburn LLP; Rahan Uddin

(57) ABSTRACT

Provided herein is a system, method, and computer program product for modifying a language conversation model of the language learning system. Modifying the language conversation model includes receiving, using a conversational sub-system, voice inputs. The conversational sub-system converts the voice inputs to voice input data and processes the voice input data. The conversational sub-system detects an error in processing the voice input data and, based at least in part on the error, stores additional data comprising additional voice input data in a memory. The conversational sub-system applies machine learning to the additional data to derive a function that is not enabled within the language conversation model. The conversational sub-system develops an update that enables the language conversation model to implement the function. The update is applied to the language conversation model.

9 Claims, 5 Drawing Sheets

MODIFYING A LANGUAGE CONVERSATION MODEL

BACKGROUND

The present invention relates generally to modifying a language conversation model, and more specifically, to detecting errors within one or more human-computer conversations and utilizing machine learning to develop a language conversation model modification that addresses the detected errors.

Contemporary voice service systems allow a person (e.g., a customer) to verbally interact with a computer, such as when a person places a telephone call to a helpdesk line and/or a customer service center. Contemporary voice service systems are unable to process verbal inputs that do not fit a discrete input format. For example, if the input format requires receiving a name input as the first name followed by the last name, it may not be able to process an input provided as the last name followed by the first name. When contemporary voice service systems receive verbal inputs that do not fit their discrete input format, the human-computer interaction is stalled, which often results in the customer becoming frustrated and terminating the telephone call before the issue that prompted the call has been addressed.

SUMMARY

According to one or more embodiments, a method for modifying a language conversation model of a language learning system is provided herein. The method includes receiving, using a conversational sub-system, voice inputs. The method includes converting the voice inputs to voice input data and processes the voice input data. The method includes using the conversational sub-system to detect an error in processing the voice input data and, based at least in part on the error, to store additional data comprising additional voice input data in a memory. The method includes using the conversational sub-system to apply machine learning to the additional data to derive a function that is not enabled within the language conversation model. The method includes using the conversational sub-system to develop an update that enables the language conversation model to implement the function. The update is applied to the language conversation model.

According to one or more embodiments, a computer program product is provided herein. The computer program product includes a computer readable storage medium having program instructions for modifying a language conversation model of the language learning system embodied therewith. The program instructions are executable by a processor to cause a conversational sub-system of the language learning system to receive voice inputs. The conversational sub-system converts the voice inputs to voice input data and processes the voice input data. The conversational sub-system detects an error in processing the voice input data and, based at least in part on the error, stores additional data comprising additional voice input data in a memory. The conversational sub-system applies machine learning to the additional data to derive a function that is not enabled within the language conversation model. The conversational sub-system develops an update that enables the language conversation model to implement the function. The update is applied to the language conversation model.

According to one or more embodiments, a language learning system is provided herein. The language learning system includes a processor and a memory storing program instructions for modifying a language conversation model of the language learning system thereon. The program instructions are executable by a processor to cause a conversational sub-system of the language learning system to receive voice inputs. The conversational sub-system converts the voice inputs to voice input data and processes the voice input data. The conversational sub-system detects an error in processing the voice input data and, based at least in part on the error, stores additional data comprising additional voice input data in a memory. The conversational sub-system applies machine learning to the additional data to derive a function that is not enabled within the language conversation model. The conversational sub-system develops an update that enables the language conversation model to implement the function. The update is applied to the language conversation model.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Figure 1:
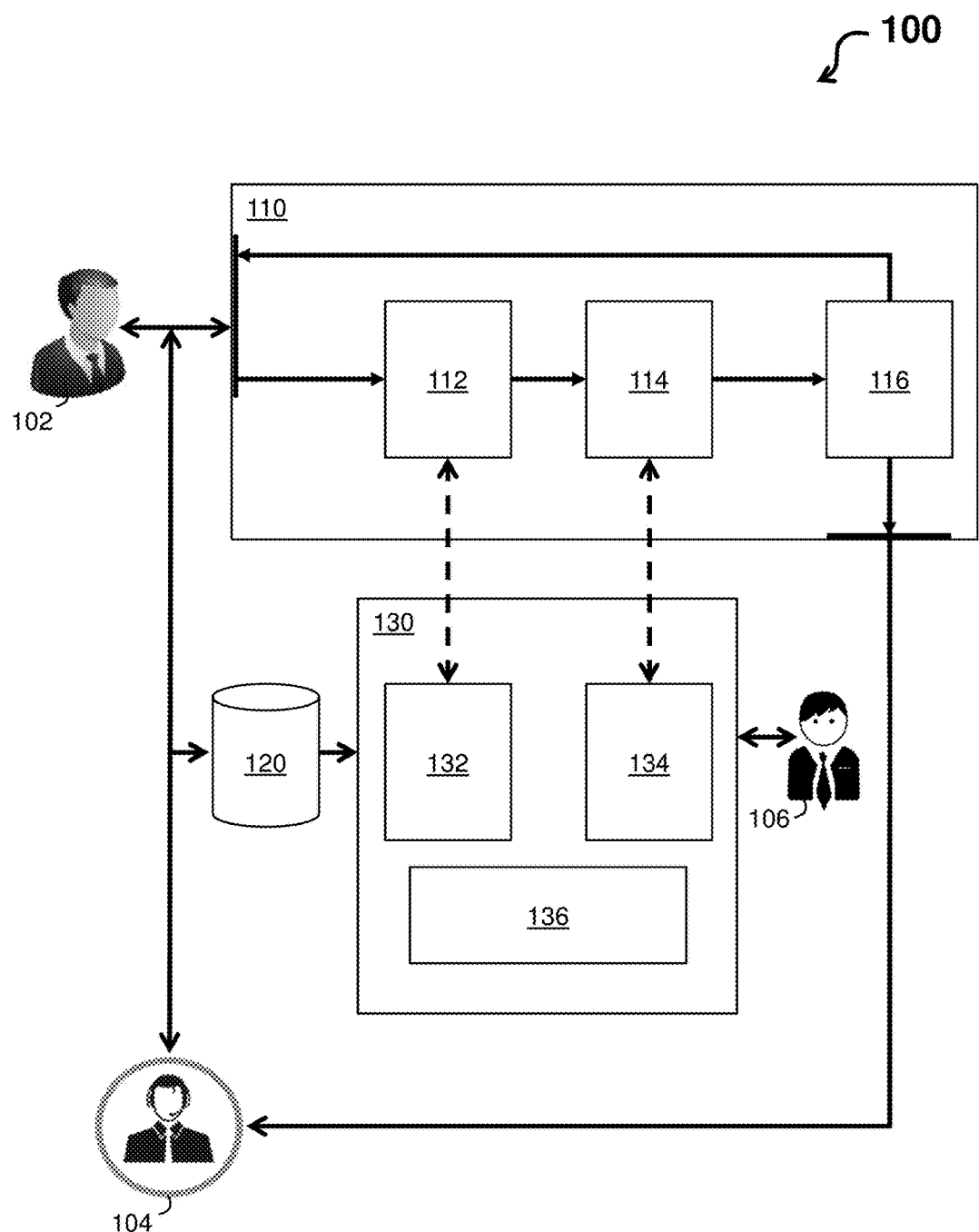
FIG. 1 depicts a block diagram of a language learning system in accordance with one or more embodiments of the present invention.

Various embodiments of the present invention will now be described with reference to the related drawings. Alternate embodiments may be devised without departing from the scope of this disclosure. Various connections are set forth between elements in the following description and in the drawings. These connections, unless specified otherwise, may be direct or indirect, and the present disclosure is not intended to be limiting in this respect. Accordingly, a coupling of entities may refer to either a direct or an indirect connection.

Additionally, although this detailed description includes computing device configurations including a computing devices, natural language processors, and machine learning modules, implementation of the teachings recited herein are not necessarily limited to a particular type or configuration of computing device(s). Rather, embodiments of the present invention are capable of being implemented in conjunction with any other type or configuration of wireless or nonwireless computing devices and/or computing environments, now known or later developed.

In general, contemporary voice service systems operate according to a so-called "prompt-and-response" methodology. For example, after answering a call placed by a customer to a customer service center, a contemporary voice service system prompts the customer to provide discrete verbal replies such as the customer's name in a predetermined format (e.g., "Hello, please state your first and last name"). Even if the customer does not know the predetermined format for the discrete reply (e.g., [First Name] [Last Name]), for simple inquiries it is hoped that the customer will respond with words that fit the format (e.g., by only stating their name, "John Smith"). The contemporary voice service system proceeds with the prompt-and-response methodology until it procures enough customer response data to categorize and forward the call to an appropriate department.

A contemporary voice service system executing a prompt-and-response methodology is unable to process a response that does not comply with a predetermined format. For example, a response can be provided in a conversational manner that includes information that does not fit the predetermined reply format, along with information that fits the predetermined reply format (e.g., "Hello, my name is Smith. I mean John. My name is John Smith."). When a contemporary voice service system is unable to process the response, the prompt-and-response methodology is stalled and errors are generated. In response to the error, the contemporary voice service system will often communicate that the response was not understood and repeat the original request. Attempting to interact with a voice service system that does not understand the verbal responses can be frustrating to customers.

Turning now to an overview of aspects of the present invention, one or more embodiments include a language learning system, method, and/or computer program product (referred to herein a "language learning system") for utilizing a language conversation model to generate human-computer conversations and detect errors within the human-computer conversations. The language learning (LL) system of the described embodiments can utilize the detected errors to modify the language conversation model to avoid future errors.

Turning now to FIG. 1, a language learning (LL) system 100 is shown in accordance with one or more non-limiting embodiments of the present invention. The LL system 100 includes a conversational sub-system 110, a learning sub-system 130, and a chat log facility 120, configured and arranged as shown. The conversational sub-system 110 includes a natural language understanding module 112, a dialog interpreter 114, and an expert intervention classifier 116, configured and arranged as shown. The learning sub-system 130 includes a natural language understanding modifier 132, a dialog flow modifier 134, and a controller 136, configured and arranged as shown. The components of LL system 100 are in electronic communication with each other over transmission media that can be wired, wireless, local, remote, or any combination thereof. FIG. 1 also depicts a user 102, a subject matter expert 104, and a designer 106, all of whom can interact with the LL system 100 according to one or more embodiments of the invention.

In an example operation according to aspects of the invention, the LL system 100 receives vocal interactions (e.g., voice inputs of a human-computer conversation) between the user 102 and the conversational sub-system 110. Examples of the conversational sub-system 110 include, but are not limited to, Watson Dialog Service, Watson Conversations Service, wit.ai, and api.ai. These vocal interactions are converted to natural language input data (e.g., voice input data) using a language conversation model (not shown) of the conversational sub-system 110. The conversation sub-system 110 processes the natural language input data to provide natural language output data (i.e., "information") to the user 102 in real-time. The conversational sub-system 110 also detects errors in the processing of natural language input data. Such errors include the instances when the conversational sub-system 110 is not able to process a vocal interaction of the user 102 (e.g., when a conversational/natural language response is unable to be converted using the language conversation model). In accordance with aspects of the present invention, when the LL system 100 determines that errors have resulted in a failure of the human-computer conversation, the subject matter expect 104 is prompted to relieve the conversational sub-system 110 and continue with a human-human conversation to provide the information to the user 102. The LL system 100 utilizes the chat log facility 120 to store the human-computer conversation, the natural language input data, the detected errors, and the human-human conversation (i.e., conversations between the user 102 and the subject matter expert 104) as chat data. The LL system 100 utilizes the learning sub-system 130 to analyze the (current and prior) chat data. Based on this analysis, the learning sub-system 130 can "learn" new functionality that is provided as updates to the language conversation model that avoid future errors to the language conversation model of the conversational sub-system 110. The developer 106 can interact with the learning sub-system 130 to further refine the updates.

The configuration of components shown in FIG. 1 is an example. In other implementations, one or more of the separate components of LL system 110 can be combined, functionality that is performed in a one component of LL system 100 can instead be performed by another component, or functionality that is performed in a single component of LL system 100 can in alternative implementations be distributed among multiple components. Thus, the same operability provided by LL system 100 can be provided using fewer, greater, or differently named components. The LL system 100 can be implemented using one or more combinations of hardware and/or software.

In one or more embodiments, the LL system 100 can be a single processing system that supports and executes the conversational sub-system 110, the chat log facility 120, and the learning sub-system 130 using various hardware and/or software. In one or more embodiments, the conversational sub-system 110, the chat log facility 120, and the learning sub-system 130 can be separately supported and executed by one or more individual processing systems, each of which comprise various hardware and/or software tailored to the operations of the conversational sub-system 110, the chat log facility 120, and the learning sub-system 130.

The LL system 100 can further include a user interface module (not shown) and an application programmable interface module (not shown), and these modules can be integrated with any of the components of LL system 100. A user interface module can include computer readable program instructions configured to generate and mange user interfaces that receive natural language inputs (e.g., vocal interactions from the user 102) and present natural language outputs (e.g., prompts to the user 102 by the conversational sub-system 110). An application programmable interface module can include computer readable program instructions configured to specify how other modules, applications, devices, and the like interact with each other (e.g., how the conversational sub-system 110 and the learning sub-system 130 interact).

One or more humans, e.g., the user 102, the subject matter expert 104, and the designer 106, can interact with the conversational sub-system 110, the chat log facility 120, and/or the learning sub-system 130. The user 102 can be a customer who engages in a human-computer conversation with the conversational sub-system via a telephone call, voice chat, video chat, etc. In accordance with one or more embodiments of the invention, the subject matter expert 104 can be a language professional who supports the human-computer conversations between the user 102 and the conversational sub-system 110 by taking over the human-computer conversations when a disconnect is detected. The subject matter expert 104 can take over (assume control of) the human-computer conversations in response to a prompt from the LL system 100 or via a direct override input from the subject matter expert. The subject matter expert 104 need not have a technical understanding of the LL system 100. The designer 106 can be a developer and/or system expert who have the technical understanding to design, build, and maintain the LL system 100.

The LL system 100 can be implemented in an electronic, computer framework that includes and/or employs any number and combination of processing systems (e.g., processing system 500 shown in FIG. 5) and networks utilizing various communication technologies, as described herein. Additionally, and as described in greater detail subsequently herein, components of LL system 100 include natural language processing (NLP) functionality. NLP is a field of computer science, artificial intelligence, and computational linguistics concerned with the interactions between computers and humans using languages (i.e., natural languages). As such, NLP is related to the area of human—computer interaction. Among the challenges in implementing NLP systems is enabling computers to derive meaning from NL inputs, as well as the effective and efficient generation of NL outputs.

Included among NLP systems are natural language processing question & answer (NLP Q&A) systems. NLP Q&A systems can answer natural language questions by querying data repositories and applying elements of language processing, information retrieval and machine learning to arrive at a conclusion. NLP Q&A systems can assist humans with certain types of semantic query and search operations, such as the type of natural question-and-answer paradigm of a medical environment. An example NLP Q&A system is the DeepQA technology developed by IBM. DeepQA systems and methodologies have been developed that are able to understand complex questions input to the system in natural language, and are able to answer the questions to augment human handling of the same questions within a given environment, such as a medical inquiry and diagnostic paradigm.

Additionally, and as described in greater detail subsequently herein, components of LL system 100 can include machine learning functionality. A machine learning system or module includes a trainable machine learning algorithm that can be trained to learn functional relationships between inputs and outputs that are currently unknown. In one or more embodiments, machine learning functionality can be implemented using an artificial neural network (ANN) having the capability to be trained to perform a currently unknown function. The phrase "machine learning" broadly describes a primary function of electronic systems that learn from data. In machine learning and cognitive science, ANNs are a family of statistical learning models inspired by the biological neural networks of animals, and in particular the brain. ANNs can be used to estimate or approximate systems and functions that depend on a large number of inputs and are generally unknown.

ANNs are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

Turning now to a more detailed description of the specific components of LL system 100 shown in FIG. 1, conversational sub-system 110 can be implemented as a conversational platform that is configured to carry out a human-computer conversation. The conversation sub-system 110 includes a language conversation module that includes hardware and/or software configured to convert natural language vocal inputs received from the user 102 into natural language data that can be interpreted and responded to by the conversational sub-system 110. The language conversation model can take a variety of formats. In one or more embodiments, the language conversation model includes one or more data structures that define dialog elements and flows. For example, the language conversation model can express one or more dialog flows as a tree, where a dialog element is a node in the tree and each dialog flow is one or more branches (in some cases a single dialog flow can be the entire tree). The conversational sub-system 110 can also define how to traverse the tree in a flow control strategy. In this way, any point in a human-computer conversation can be represented by one of the nodes of the tree, and a next possible action can be a distribution of the neighboring nodes.

The language conversation model is further configured to generate an error when an attempted human-computer conversation is not represented by one of the nodes. More specifically, in embodiments described herein, the language conversation model is configured to generate an error when the language conversation model cannot convert a received vocal input to natural language input data that can be interpreted and responded to by the conversational sub-system 110. For example, the vocal input could be provided by the user 102 in a format that does not match any node of the language conversation model tree. A human-computer conversation that includes an error is identified herein as an infeasible conversation.

The natural language understanding module 112 and the dialog interpreter 114 provide a natural language understanding model and a dialog model that construct the language conversation model and process the human-computer conversation as described herein. The natural language understanding module 112 can be implemented as hardware and/or software configured to convert natural language of a human-computer conversation into natural language input data having a sematic structure. For example, the natural language can be any spoken word by the user 102, and the sematic structure can be so-called "intents" and "entities" nested within that natural language. Intents are notions of expressing a current goal of the user 102. Entities are domain objects that can precisely capture the intents of the user 102.

In one or more embodiments, the natural language understanding module 112 is configured to identify intents and entities of a human-computer conversation. The natural language understanding module 112 can use the identified intents and entities to create dialog elements and flows within a dialog data structure (e.g., create the language conversation module tree that captures different dialog flows. Table 1 illustrates an embodiment of expressing an Intent0, where the natural language understanding module 112 provides a distribution over the Intent0 for each utterance by the user 102.

TABLE 1

| Intent0 | Type | Examples Utterance |
|---|---|---|
| #weather | Classifier Based | What is the weather in Bangalore? Will it be sunny in Delhi? |
| | Rule Based | .* weather .* .* sunny .* |

The dialog interpreter 114 can be implemented as hardware and/or software that utilize the semantic structure returned by the natural language understanding module 112 to define the dialog flow. The dialog flow is an intuitive and natural simulation of two humans conversing by the dialog interpreter 114 using dialog context and information. In turn, the dialog flow can be utilized by the dialog interpreter 114 to decide what should be provided back to the user 102 at any point in the human-computer conversation. For example, based on the semantic structure output by the natural language understanding module 112, the dialog interpreter 114 can understand context sensitive questions, collect necessary entities to complete a task, manage digressions in a chat, manage greetings, execute chit chat, perform graceful chat terminations, etc.

The expert intervention classifier 116 functions primarily to detect errors. The expert intervention classifier 116 can be implemented as hardware and/or software configured to implement a rule based classifier and/or a statistical classifier that determines errors in a current human-computer conversation. The current human-computer conversation can be an on-going or current conversation between the user 102 and the conversational sub-system 110. The expert intervention classifier 116 can further include a mechanism for determining a confidence with which the LL system 100 responds to the user 102, a mechanism for determining utterance text provided so far in the current human-computer conversation, a mechanism for determining dialog acknowledgments used in the current human-computer conversation (e.g., like SIGNAL-NON-UNDERSTANDING, RHETORICAL-QUESTIONS), a mechanism for determining whether the LL system 100 is using a default answer to answer the user 102, a mechanism for detecting verbal cues from an utterance (such as sarcasm), a mechanism for determining non-verbal cues (such as emotion conveyed), etc.

When the expert intervention classifier 116 determines that the conversational sub-system 110 is not able to correctly process the current human-computer conversation, the expert intervention classifier 116 can divert control of the current human-computer conversation from the conversational sub-system 110 to the subject matter expert 104 (who can in turn complete the conversation with the user 102 as a human-human conversation). In one or more embodiments of the invention, the user 102 can activate the divert operation of the expert intervention classifier 116 to manually divert the conversation from the conversational sub-system 110 to the subject matter expert 104 (e.g., the user 102 can provide an explicit request for human intervention). In one or more embodiments, the subject matter expert 104 can observe the current human-computer conversation and activate the divert operation to take over control from the conversational sub-system 110 (e.g., the subject matter expert 104 can provide an explicit request for human intervention). The manual activation of the divert operation can include input mechanisms operated by the user 102 and/or the subject matter expert 104, such as pressing '#' on a keypad, stating "representative" during the human-computer conversation, selecting an icon on a user interface, etc.

The chat log facility 120 stores conversations within the LL system 100 and data associated with those conversations, such as detected errors, as chat data. In general, the chat log facility 120 can include a database, data repository or other data store and can include various kinds of mechanisms for storing, accessing, and retrieving various kinds of data, including a hierarchical database, a set of files in a file system, an application database in a proprietary format, a relational database management system (RDBMS), etc. The chat log facility 120 can be included within a processing system employing a computer operating system (e.g., processing system 500 shown in FIG. 5, an ANN, a natural language processor, etc.).

The learning sub-system 130 is a learning platform that can be implemented as hardware and/or software that is configured to identify and learn a function based on input data and output data. In embodiments described herein, the input data is the voice input from the user 102 during a human-human conversation between the user 102 and the subject matter expert 104 that results from a divert operation and is stored in the chat log facility 120. The output data is the voice output from the subject matter expert 104 during the same human-human conversation between the user 102 and the subject matter expert 104 that results from a divert operation and is stored in the chat log facility 120. The learning sub-system 130 utilizes machine learning to learn the function that controls the output provided by the subject matter expert 104, and uses that function to develop an update to the language conversation model of the conversational sub-system 110 that would allow the conversational sub-system 110 to accurately process the human-human conversation between the user 102 and the subject matter expert 104 that resulted from a divert operation. The update is provided to the conversational subsystem 110 utilizing the natural language understanding modifier 132, the dialog flow modifier 134, and the controller 136. The natural language understanding modifier 132, the dialog flow modifier 134, and the controller 136 can be implemented as hardware and/or software components of the learning sub-system 130. The learning sub-system 130 updates the language conversation model such that the infeasible conversations that have been stored in the chat log facility 120 can be process by the conversational sub-system 110 using an updated language conversation model.

Modifying the language conversation model by the learning sub-system 130 includes updating the natural language understanding model of the natural language understanding module 112 via the natural language understanding modifier 132. Note that updates in the natural language understanding model can comprise, but are not restricted to, adding a new intent (or rule), deleting an intent (or rule), removing an example to an intent (or rule), adding an example to an intent (or rule), adding an entity, removing an entity, adding an entity value/example, removing an entity value/example, or a combination thereof.

Further, modifying the language conversation model by the learning sub-system 130 includes updating the dialog model of the dialog interpreter 114 via the dialog flow modifier 134. Note that updates in the dialog interpreter model can comprise, but are not restricted to, adding a new node to the dialog flow tree (or graph), deleting an existing node, changing the constraints defined in any node, adding an edge in the tree (or graph), or a combination thereof.

In one or more embodiments, the natural language understanding modifier 132 detects a set of updates required in the natural language understanding model given the current language conversation model and any chat data. The dialog flow modifier 134 detects a set of updates required in the dialog model given the current language conversation model and any chat data. Multiple sets of updates to the natural language understanding model and the dialog model can be required in order to make an infeasible conversation feasible in the updated language conversation model. These multiple sets of updates can be scored based on preferences chosen via the controller 136 by the designer 106, who can then select and apply updates to obtain the updated language conversation model. In one or more embodiments, a first set of updates in a scored list of updates can be chosen and applied to the current language conversation model to generate the updated language conversation model. The score can also include a component that represents a quality score that indicates a quality of the updates.

Figure 2:
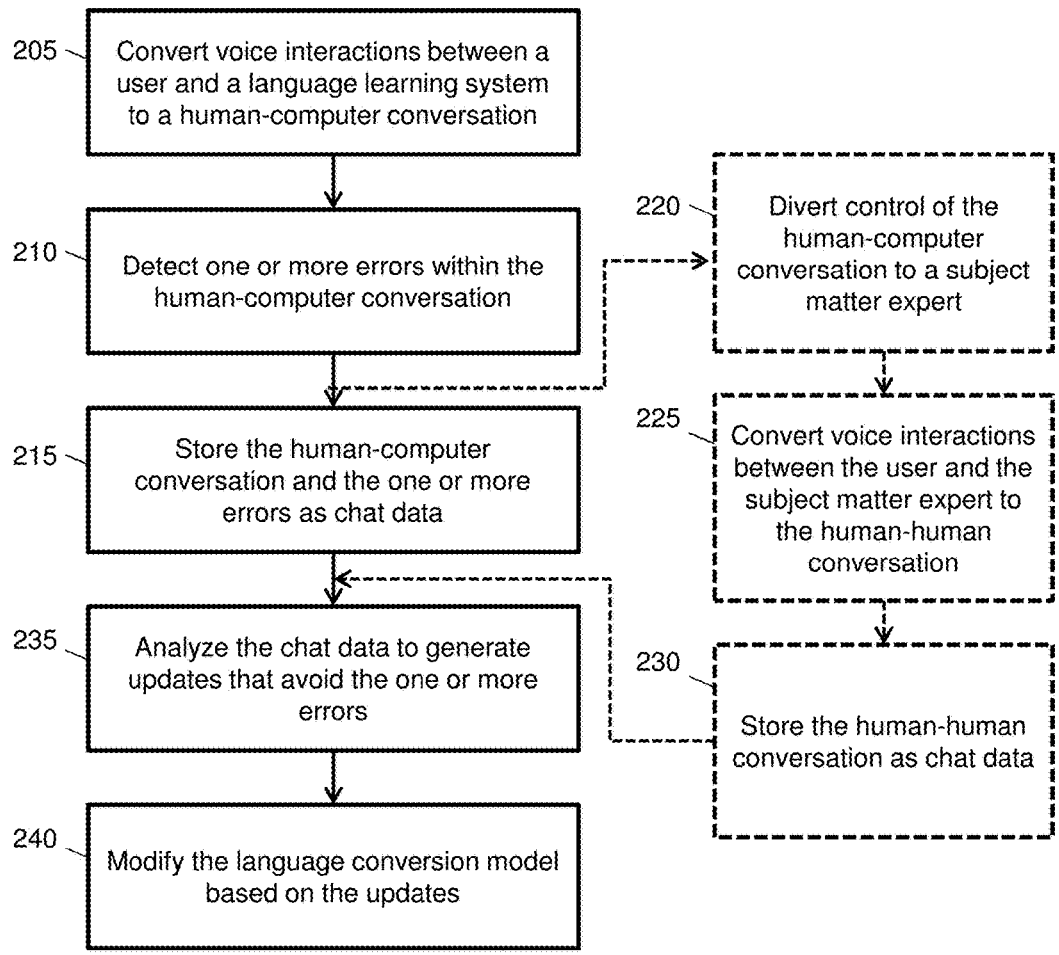
FIG. 2 depicts a process flow of a language learning system in accordance with one or more embodiments of the present invention.

Turning now to FIG. 2, a process flow 200 of a LL system (e.g., LL system 100 shown in FIG. 1) is generally shown in accordance with one or more embodiments. The process flow 200 begins at block 205, where the LL system converts voice interactions between a user and a LL system to a human-computer conversation. For instance, LL system, using a conversational sub-system, receives voice inputs and converts the voice inputs to voice input data, which is subsequently processed.

At block 210, the LL system detects one or more errors within the human-computer conversation. Continuing with the above example, the conversational sub-system detects an error in processing the (human-computer) voice input data. At block 215, the LL system stores the human-computer conversation and the one or more errors as chat data. For instance, the LL system uses a memory to store additional data comprising additional voice input data, which is based at least in part on the error and/or the processing of the human-computer voice input data.

The process flow 200 can follow with an alternate or simultaneous path. For instance, in response to detecting one or more errors, the process flow 200 can also proceed to blocks 220, 225, and 230. At block 220, the LL system diverts control of the human-computer conversation to a subject matter expert. Once the subject matter expert has control, a human-human conversation ensues between the use and the subject matter expert. In a non-limiting embodiment, the LL system provides a prompt to a subject matter expect indicating that the error in processing was detected. The subject matter expert, in response, can respond assume control of the human-computer conversation. Alternatively, the subject matter expert can submit a direct override input to the LL system to take over the human-computer conversation regardless of whether the prompt was provided. At block 225, the LL system diverts converts voice interactions between the user and the subject matter expert to the human-human conversation. For instance, LL system, using a conversational sub-system, receives voice inputs of the human-human conversation (e.g., second voice inputs) and converts the second voice inputs to (human-human) voice input data, which is subsequently processed. At block 230, the LL system diverts stores the human-human conversation as chat data. For instance, the LL system uses a memory to store additional data comprising additional voice input data, which is based at least in part on the error and/or the processing of the human-human voice input data.

Regardless of whether the process flow 200 proceeds through block 215 and/or proceed to blocks 220, 225, and 230, the LL system can analyze the chat data to learn a new function (i.e., the function that controlled the infeasible conversation) and generate updates that avoid the one or more errors. As shown at blocks 235 and 240 of FIG. 2, the LL system can analyze the chat data (sourced from one or both of the human-computer conversation and human-human conversation) to generate updates that avoid the one or more errors and modify the language conversation model based on the updates. In a non-limiting embodiment, the LL system applies machine learning to the additional data (sourced from one or both of the human-computer voice input data and the human-human voice input data) to derive a function that is not enabled within the language conversation model. Further, the LL system develops an update that enables the language conversation model to implement the function and applying the update to the language conversation model.

Figure 3:
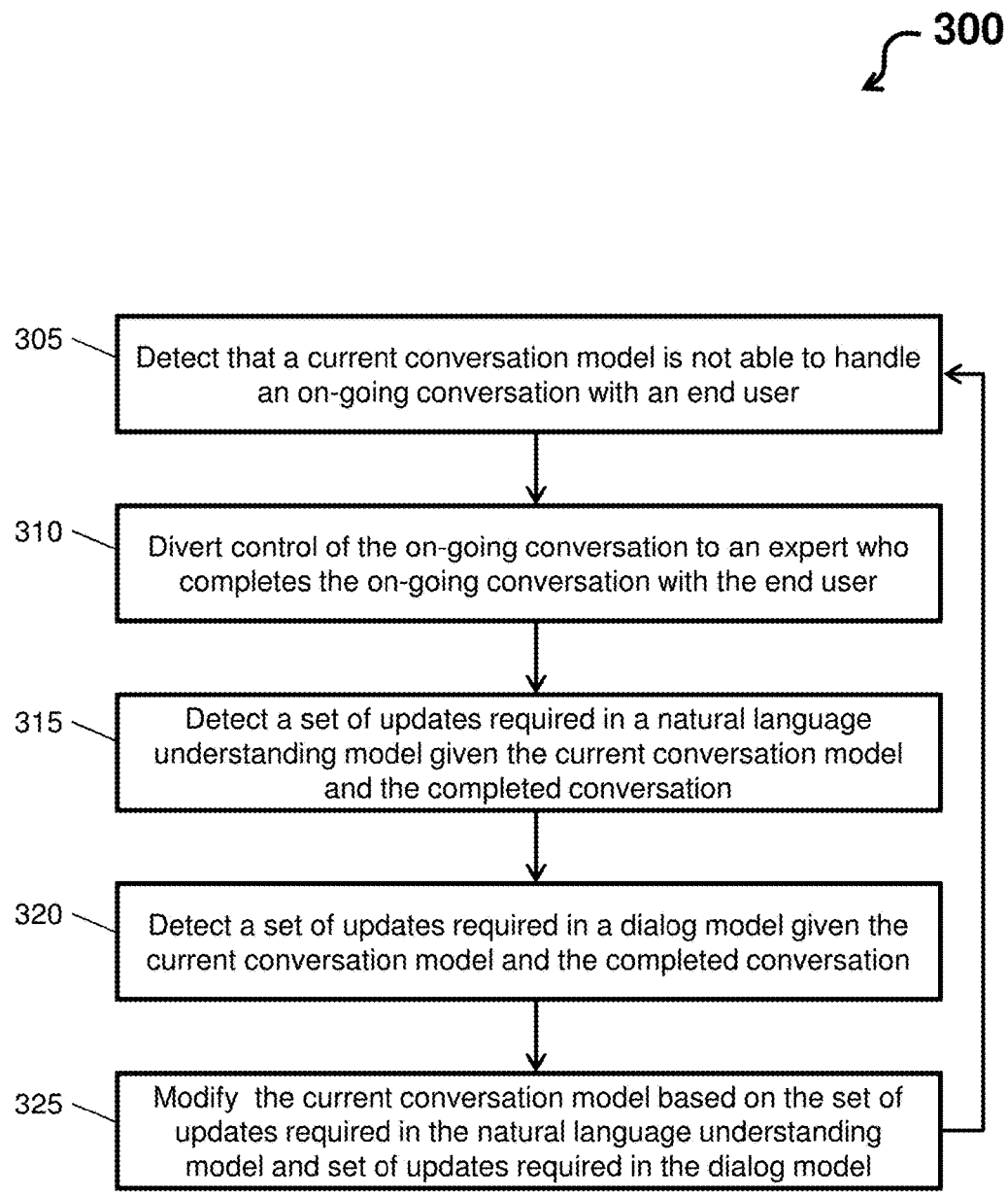
FIG. 3 depicts a process flow of a language learning system in accordance with one or more embodiments of the present invention.
Figure 4:
FIG. 4 depicts an example conversation stored by a language learning system in accordance with one or more embodiments of the present invention.

Turning now to FIG. 3, a process flow 300 of a LL system (e.g., LL system 100 shown in FIG. 1) is generally shown in accordance with one or more embodiments. The process flow 300 begins at block 305, where the LL system detects that a current conversation model is not able to handle an on-going conversation with an end user. FIG. 4 depicts a table 400 illustrating a combined on-going conversation and completed conversation stored by a LL system in accordance with an embodiment. The table 400 includes a first column ("Actor"), which identifies who is currently speaking within the on-going conversation, and a second column ("Example Utterance"), which identifies what was spoken by the action. As shown in row 405 of table 400, the LL system received a response from the user ("What do you mean?") that it was not able to handle.

At block 310, the LL system diverts control of the on-going conversation to an expert who completes the on-going conversation with the end user. As shown in row 415 of table 400, the LL system prompted a subject matter expert to assume control of the on-going conversation. Further, as shown in rows 425 and 435 of table 400, the subject matter expert completes the on-going conversation with the user.

At block 315, the LL system detects a set of updates required in a natural language understanding model given the current conversation model and the completed conversation.

At block 320, the LL system detects a set of updates required in a dialog model given the current conversation model and the completed conversation.

At block 305, the LL system modifies the current conversation model based on the set of updates required in the natural language understanding model and set of updates required in the dialog model.

Figure 5:
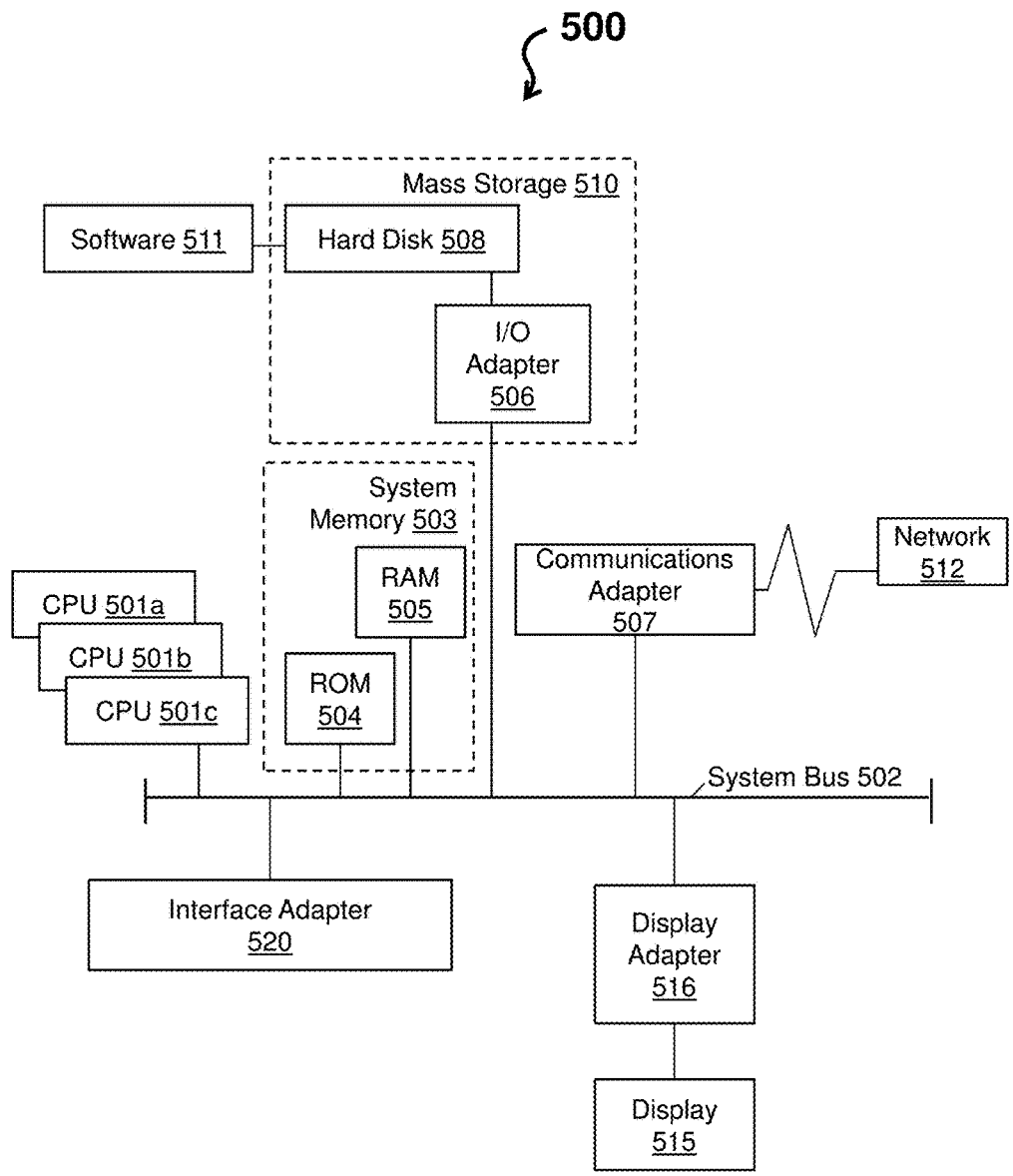
FIG. 5 depicts a processing system for implementing one or more embodiments of the present invention.

FIG. 5 depicts an example of a system 500 in accordance with one or more embodiments. The system 500 has one or more central processing units (CPU(s)) 501a, 501b, 501c, etc. (collectively or generically referred to as processor(s) 501). The processors 501, also referred to as processing circuits, are coupled via a system bus 502 to system memory 503 and various other components. The system memory 503 can include a read only memory (ROM) 504 and a random access memory (RAM) 505. The ROM 504 is coupled to the system bus 502 and may include a basic input/output system (BIOS), which controls certain basic functions of the system 500. The RAM is read-write memory coupled to the system bus 502 for use by the processors 501.

FIG. 5 further depicts an input/output (I/O) adapter 506 and a communications adapter 507 coupled to the system bus 502. The I/O adapter 506 may be a small computer system interface (SCSI) adapter that communicates with a hard disk 508 and/or any other similar component. The I/O adapter 506 and the hard disk 508 are collectively referred to herein as a mass storage 510. A software 511 for execution on the system 500 may be stored in the mass storage 510. The mass storage 510 is an example of a tangible storage medium readable by the processors 501, where the software 511 is stored as instructions for execution by the processors 501 to cause the system 500 to operate, such as is described herein with reference to FIGS. 2-3. Examples of computer program product and the execution of such instruction is discussed herein in more detail. Referring again to FIG. 5, an a communications adapter 507 interconnects the system bus 502 with a network 512, which may be an outside network, enabling the system 500 to communicate with other such systems. A display (e.g., screen, a display monitor) 515 is connected to the system bus 502 by a display adapter 516, which may include a graphics controller to improve the performance of graphics intensive applications and a video controller. In one embodiment, the adapters 506, 507, and 516 may be connected to one or more I/O buses that are connected to the system bus 502 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to the system bus 502 via an interface adapter 520 and the display adapter 516. A keyboard, a mouse, a speaker, etc. can be interconnected to the system bus 502 via the interface adapter 520, which may include, for example, a Super I/O chip integrating multiple device adapters into a single integrated circuit.

Thus, as configured in FIG. 5, the system 500 includes processing capability in the form of the processors 501, and, storage capability including the system memory 503 and the mass storage 510, input means such as the keyboard and the mouse, and output capability including the speaker and the display 515. In one embodiment, a portion of the system memory 503 and the mass storage 510 collectively store an operating system, such as the z/OS or AIX operating system from IBM Corporation, to coordinate the functions of the various components shown in FIG. 5.

Technical effects and benefits of embodiments of the LL system include detecting errors by hardware and/or software components of the LL system that otherwise cannot be found by contemporary voice services (e.g., errors resulting from not automatically handling/processing vocal interactions, errors resulting from insufficient certainty regarding handling/processing vocal interactions, and customer frustrations with respect to handling/processing vocal interactions).

Technical effects and benefits of embodiments of the LL system include automatically switching a conversation from the LL system to the subject matter expert in view of detected errors and automatically modifying the LL system's ability to handle/process the vocal interaction based on the subject matter expert actions, each of which prevents or reduces customer frustrations. Thus, embodiments described herein are necessarily rooted in the hardware and/or software components of the LL system to perform proactive operations to overcome problems specifically arising in the realm of human-computer conversations. These problems include scenarios where contemporary voice services do not know how to respond and display default messages, where contemporary voice services do not have good confidence and still proceed with a conversation based on an underlying design, and where contemporary voice services proceed with a conversation as designed despite customer frustration.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of modifying a language conversation model of a language learning system, the method comprising:

receiving, using a conversational sub-system, voice inputs;

converting, using the conversational sub-system, the voice inputs to voice input data;

processing, using the conversational sub-system, the voice input data;

detecting, using the conversational sub-system, an error in processing the voice input data, the error comprises a natural language response that is unable to be converted using the language conversation model, and in response to the error:

analyzing chat data to learn an infeasible conversation function, generating updates with respect to the infeasible conversation function that modify language conversation model to avoid the error, and prompting a subject matter expert to relieve control from the conversational sub-system and continue with a human-human conversation upon detecting the error;

based at least in part on the error, storing, using a memory, additional data comprising additional voice input data;

applying machine learning to the additional data to derive a function that is not enabled within the language conversation model;

developing an update that enables the language conversation model to implement the function including assigning to the update a quality score that indicates a quality of the update; and applying the update to the language conversation model; and diverting control from the language learning system to the subject matter expert upon receiving a direct override input from the subject matter expert.

2. The computer-implemented method of claim 1 further comprising storing, by a chat log facility of the language learning system, the voice input data and the error as the chat data.

3. The computer-implemented method of claim 1, wherein the language learning system receives an input from a developer that refines the update.

4. A computer program product, the computer program product comprising a non-transitory computer readable storage medium having program instructions for modifying a language conversation model of a language learning system embodied therewith, the program instructions executable by a processor of the language learning system to cause:

receiving, using a conversational sub-system, voice inputs;

converting, using the conversational sub-system, the voice inputs to voice input data;

processing, using the conversational sub-system, the voice input data;

detecting, using the conversational sub-system, an error in processing the voice input data, the error comprises a natural language response that is unable to be converted using the language conversation model, and in response to the error:

analyzing chat data to learn an infeasible conversation function, and generating updates with respect to the infeasible conversation function that modify language conversation model to avoid the error, and prompting a subject matter expert to relieve control from the conversational sub-system and continue with a human-human conversation upon detecting the error;

based at least in part on the error, storing, using a memory, additional data comprising additional voice input data;

applying machine learning to the additional data to derive a function that is not enabled within the language conversation model;

developing an update that enables the language conversation model to implement the function including assigning to the update a quality score that indicates a quality of the update; and applying the update to the language conversation model; and diverting control from the language learning system to the subject matter expert upon receiving a direct override input from the subject matter expert.

5. The computer program product of claim 4, wherein the program instructions are further executable by the processor to cause storing, by a chat log facility of the language learning system, the voice input data and the error as the chat data.

6. The computer program product of claim 4, wherein the language learning system receives an input from a developer that refines the update.

7. A language learning system, comprising a processor and a memory storing program instructions for modifying a language conversation model of the language learning system thereon, the program instructions executable by a processor to cause:

receiving, using a conversational sub-system, voice inputs;

converting, using the conversational sub-system, the voice inputs to voice input data;

processing, using the conversational sub-system, the voice input data;

detecting, using the conversational sub-system, an error in processing the voice input data, the error comprises a natural language response that is unable to be converted using the language conversation model, and in response to the error:

analyzing chat data to learn an infeasible conversation function, and generating updates with respect to the infeasible conversation function that modify language conversation model to avoid the error, and prompting a subject matter expert to relieve control from the conversational sub-system and continue with a human-human conversation upon detecting the error;

based at least in part on the error, storing, using a memory, additional data comprising additional voice input data;

applying machine learning to the additional data to derive a function that is not enabled within the language conversation model;

developing an update that enables the language conversation model to implement the function including assigning to the update a quality score that indicates a quality of the update; and applying the update to the language conversation model; and diverting control from the language learning system to the subject matter expert upon receiving a direct override input from the subject matter expert.

8. The language learning system of claim 7, wherein the program instructions are further executable by the processor to cause storing, by a chat log facility of the language learning system, the voice input data and the error as the chat data.

9. The language learning system of claim 7, wherein the language learning system receives an input from a developer that refines the update.

\* \* \* \* \*